(12) United States Patent
Shiraishi et al.

(10) Patent No.: US 7,337,633 B2
(45) Date of Patent: Mar. 4, 2008

(54) PROCESS FOR PRODUCING FLAT GLASS

(75) Inventors: Yoshihiro Shiraishi, Kanagawa (JP); Motoichi Iga, Kanagawa (JP); Itsuo Matsumoto, Kanagawa (JP); Toru Kamihori, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 392 days.

(21) Appl. No.: 11/017,966

(22) Filed: Dec. 22, 2004

(65) Prior Publication Data

US 2005/0109061 A1 May 26, 2005

Related U.S. Application Data

(63) Continuation of application No. PCT/JP03/07775, filed on Jun. 19, 2003.

(30) Foreign Application Priority Data

Jun. 24, 2002 (JP) .............................. 2002-182607

(51) Int. Cl.
*C03B 18/00* (2006.01)
(52) U.S. Cl. .................. 65/25.2; 65/25.3; 65/182.2
(58) Field of Classification Search ............... 65/182.2, 65/195, 25.2, 25.3, 141, 145, 148, 150, 185, 65/245
See application file for complete search history.

(56) References Cited

U.S. PATENT DOCUMENTS 2,878,621 A 3/1959 Zellers, Jr. et al.
3,150,948 A 9/1964 Gladieux et al.
6,101,845 A 8/2000 Kojima et al.
6,311,523 B1 11/2001 Kojima et al.

FOREIGN PATENT DOCUMENTS

| EP | 884283 A1 | 12/1998 |
|---|---|---|
| JP | 2001-192218 A | 7/2001 |
| JP | A-2001-180950 | 7/2001 |
| JP | A-2001-180951 | 7/2001 |
| JP | A-2001-192219 | 7/2001 |
| JP | 2002-193630 A | 7/2002 |

*Primary Examiner*—Steven P. Griffin
*Assistant Examiner*—DeMaris R. Wilson
(74) *Attorney, Agent, or Firm*—Oblon, Spivak, McClelland, Maier & Neustadt, P.C.

(57) ABSTRACT

The present invention relates to production of a flat glass, which can improve the surface smoothness of a flat glass in the moving direction and which prevents formation of stripes on the flat glass. A fixed bed 15 comprising a plurality of supports 12 arranged in such a state that they will not move at least in a direction in parallel with the moving direction of a glass ribbon 13, and having grooves 12B to let loose the steam generated by vaporization of a steam film forming agent formed between the respective supports 12, is used, and the amount of the steam let loose from the grooves is adjusted in accordance with the glass temperature distribution in the moving direction of the glass ribbon 13 which moves on the fixed bed 15.

17 Claims, 5 Drawing Sheets

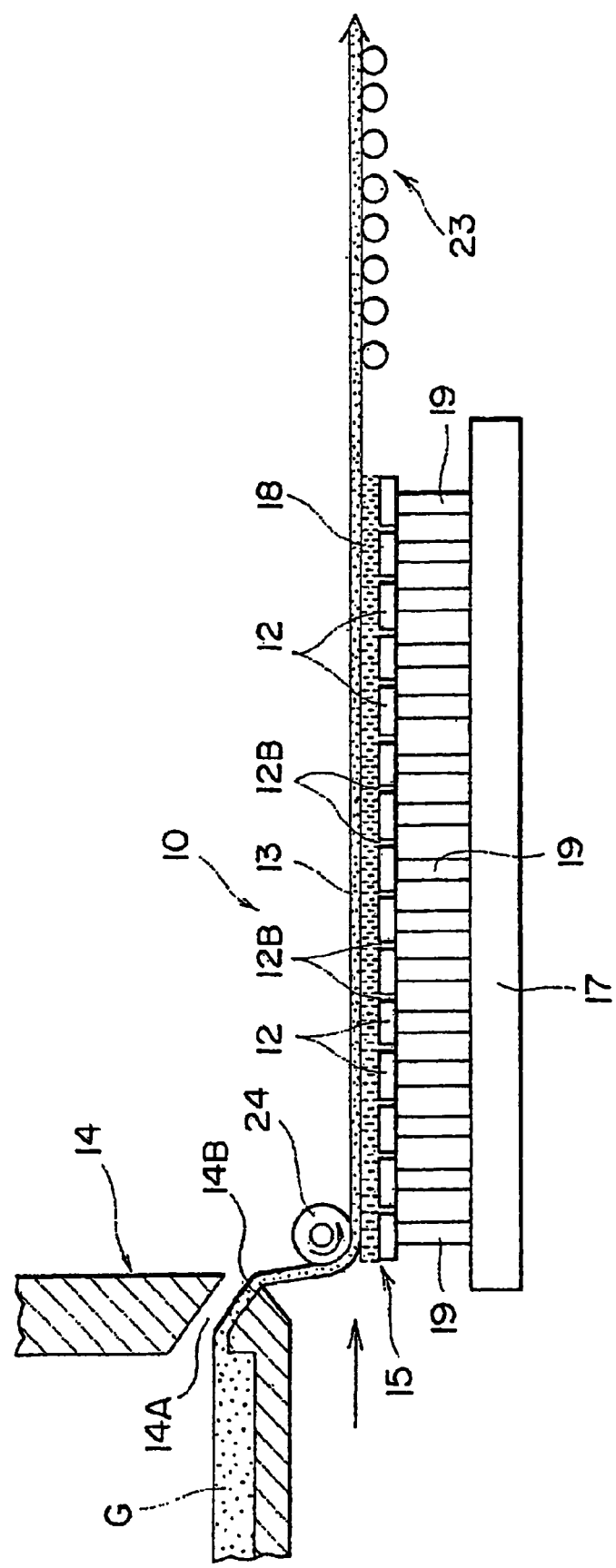

PROCESS FOR PRODUCING FLAT GLASS

TECHNICAL FIELD

The present invention relates to a process for continuously producing a thin flat glass, particularly, it relates to improvement to stably form a thin flat glass having a uniform thickness.

BACKGROUND ART

As a process for producing a flat glass, a tin float process employing molten tin, a pull method, a down draw process, a fusion process and the like have been known.

However, in the above tin float process, since a glass ribbon is floated on a medium having a higher thermal conductivity than glass (on a float bath of molten tin) for forming, the transfer of heat to the medium is significant, and the influence of the temperature of the medium is significant, and accordingly the temperature control of the medium is very important. Further, gradual cooling is required under strict control by making the temperature of the medium close to the temperature of the glass so that the difference in the temperature between the surface and the inside of the glass ribbon during cooling is small. Accordingly, the cooling has to be carried out slowly, an adequately long float bath is required, and accordingly the forming time tends to be long. Further, in view of quality also, various drawbacks derived from tin are likely to occur. Further, exhaustion of tin resource is concerned.

On the other hand, in the pull method, the down draw process and the fusion process, due to forming in a vertical direction, it tends to be difficult to control the force resulting from the gravity to the glass ribbon, whereby it tends to be difficult to control the thickness of the glass, and the temperature control of the medium to decrease the difficulty becomes complicated.

Under these circumstances, the present applicant has proposed a technique relating to a process for forming a flat glass by forming a glass ribbon in a molten state into a plate shape via a thin layer of a steam film by using a base containing a steam film forming agent (hereinafter referred to as "steam float process") (JP-A-9-295819). Further, the present applicant have filed also an application regarding peripheral technology relating to the process for producing a flat glass. According to this process for producing a flat glass, such effects as resource saving, energy saving, high quality of the flat glass, decrease in equipment and operation cost, easiness of job change and possibility of variety of applications to small scale production to large scale production, can be obtained.

An apparatus for producing a flat glass by this steam float process is as shown in FIG. 5. A plurality of rectangular supports 12, 12 . . . formed by a material capable of containing a liquid therein or formed into a structure capable of forming a liquid therein are arranged and fixed on the surface of an endless belt 20A of a belt conveyer 20 with grooves 12B with a certain distance in a longitudinal direction, and the supports 12 make a circuit by the movement of the endless belt 20A. The supply of a steam film forming agent such as water to the supports 12 is carried out when the supports pass through a supply apparatus 29 provided on the lower side of the circuit. When a molten glass G having e.g. the viscosity adjusted by a glass melting furnace 14 is supplied as a high temperature glass ribbon 13 from a slit exit 14A on the supports 12 making a circuit, the steam film forming agent is instantaneously vaporized from the support 12 to form a thin layer 18 of a steam film between the supports 12 and the glass ribbon 13. Further, the circling moving speed of the supports 12 and the moving speed of the glass ribbon 13 which moves on the supports 12 are set different from each other, so that the supports 12 and the glass ribbon 13 are made to slide on each other. Accordingly, the glass ribbon 13 is formed into a thin flat glass on the thin layer 18 of the steam film. In FIG. 5, the numerical references 20C and 20D represent a driving roll and a driven roll between which the endless belt 20A is stretched, the numerical reference 21 represents a guide plate which guides the upper moving path of the endless belt 20A, the numerical reference 23 represents carriage driving rollers which carry the glass ribbon, and the numerical references 26 and 28 represent the circuit direction of the supports, which may be either in a clockwise direction or in an anticlockwise direction.

However, in the case of a transfer type in which the supports 12 make a circuit, the thickness of the steam film or the pressure of the steam film tends to be non-uniform in the glass ribbon 13 moving direction, whereby a thickness distribution or a steam film pressure distribution of the thin layer 18 of the steam film is likely to generate. This generation of the thickness distribution or the steam film pressure distribution of the steam film may deteriorate the surface smoothness of the formed flat glass in the moving direction in some cases.

Further, in the case of the transfer type in which the supports 12 make a circuit, the landing position of the glass ribbon 13 supplied from the glass melting furnace 14 to the supports 12 and the position of grooves 12B between the supports 12 periodically agree with each other, and accordingly the glass ribbon 13 instantaneously flows down into the grooves 12B when they agree with each other, which may cause stripes on the formed flat glass.

Accordingly, in order to improve quality of a flat glass by the steam float process, the above problems have to be resolved.

The present invention has been made under these circumstances, and it is an object of the present invention to provide a process and an apparatus for producing a flat glass, which can uniformalize the surface smoothness of the formed flat glass in the moving direction and prevents formation of stripes on the flat glass.

DISCLOSURE OF THE INVENTION

In order to achieve the above object, the process for producing a flat glass of the present invention is a production process which comprises continuously forming a glass ribbon in a molten state, supplied on a fixed bed comprising a plurality of supports, into a flat glass, the supports being formed by a base made of a material capable of containing a liquid therein or formed into a structure capable of containing a liquid therein; and the process comprising a step of introducing to the supports a steam film forming agent which is not gaseous at a temperature in the vicinity of room temperature and which is gaseous at a temperature of at least the glass transition point of the glass, in a liquid state, and a step of making the supports and the glass ribbon at a temperature of at least the glass transition point slide on each other, via a thin layer of a steam film generated by vaporization of the steam film forming agent; characterized in that the fixed bed is a fixed bed comprising a plurality of the supports arranged in such a state that they will not move in a direction in parallel with the glass ribbon moving direction, and having grooves to let loose the steam generated by vaporization of the steam film forming agent formed between the respective supports, and the amount of the steam let loose from the respective grooves is adjusted in accordance with the glass temperature distribution in the moving direction of the glass ribbon which moves on the fixed bed, to form the glass ribbon into a flat glass.

Here, the grooves in the present invention include gaps in addition to the grooves in the literal sense of the word. Further, the fixed bed comprising supports which will not move in a direction in parallel with the glass ribbon moving direction means that the supports are fixed only in the glass ribbon moving direction, and they may move in another direction.

The present invention has been made under the following knowledge that when the glass temperature at the upstream side and the glass temperature at the downstream side in relation to the moving direction of the glass ribbon formed into a flat shape on the supports are compared with each other, the more the glass ribbon moves to the downstream side, the lower the glass temperature, and accordingly a glass temperature distribution is generated in the glass ribbon moving direction, which is a cause to deteriorate the surface smoothness of the formed flat glass in the moving direction. Namely, the amount of the steam generated from the supports at the upstream side which are located at a portion of the glass ribbon having a high glass temperature, and the amount of the steam generated from the supports at the downstream side which are located on a portion of the glass ribbon having a low glass temperature, are different. Resultingly, there are a thickness distribution and a steam film pressure distribution of a thin layer of a steam film between the upstream side and the downstream side of the glass ribbon, thus deteriorating the surface smoothness of the formed flat glass in the moving direction.

According to the present invention, as the fixed bed, a fixed bed comprising a plurality of supports arranged in such a state that they will not move in a direction in parallel with the glass ribbon moving direction, and having grooves to let loose the steam generated by vaporization of the steam film forming agent formed between the supports, is used. By using such a fixed bed comprising the supports which will not move in a direction in parallel with the glass ribbon moving direction, the groove widths of the respective grooves can be freely set, or the lengths of the respective supports in the glass ribbon moving direction can be freely set, whereby a structure suitable to let the steam loose can be set. Further, by such a free setting, the amount of the steam let loose from the respective grooves can be adjusted in accordance with the glass temperature distribution in the moving direction of the glass ribbon which moves on the fixed bed. Further, by employing a fixed bed, the landing position of the glass ribbon supplied on the supports and the groove position can be made not to agree with each other securely. Accordingly, the surface smoothness of the formed flat glass in the moving direction can be improved, and further, formation of stripes on the flat glass can be prevented.

In the preferred embodiment of the present invention, the amount of the steam let loose from the respective grooves is adjusted by making the lengths of the respective supports in the glass ribbon moving direction the same and by making the widths of the grooves narrower at the downstream side than at the upstream side in relation to the glass ribbon moving direction. Accordingly, at the upstream side at which the glass temperature of the glass ribbon is high and the amount of the steam generated from the supports is large, the groove width is broad and the steam is likely to be let loose, and at the downstream side at which the glass temperature of the glass ribbon is low and the amount of the steam generated from the supports is small, the groove width is narrow and the steam is hardly let loose. Accordingly, the thickness and the steam film pressure of the steam film formed between the glass ribbon and the supports are uniformalized between the upstream side and the downstream side. Accordingly, the surface smoothness of the formed flat glass in the moving direction will improve.

Further, in another preferred embodiment of the present invention, the amount of the steam let loose from the respective grooves is adjusted by making the widths of the respective grooves the same and by making the lengths of the supports in the glass ribbon moving direction longer at the downstream side than at the upstream side in relation to the glass ribbon moving direction. Accordingly, the number of grooves per unit length in the glass ribbon length direction of the fixed bed is high at the upstream side at which the glass temperature of the glass ribbon is high and the amount of the steam generated from the supports is large, and the number is low at the downstream side at which the glass temperature of the glass ribbon is low and the amount of the steam generated is low. Accordingly, the thickness and the steam film pressure of the steam film formed between the glass ribbon and the supports are uniformalized between the upstream side and the downstream side. Accordingly, the surface smoothness of the formed flat glass in the moving direction can be improved.

Further, in the preferred embodiment of the present invention, the supports are arranged so that the landing position of the glass ribbon in a molten state supplied on the supports, will not agree with the position of the grooves. This can be achieved by employing a fixed bed comprising supports, whereby formation of stripes on the flat glass can be prevented.

In order to achieve the above objects, the apparatus for continuously producing a thin flat glass of the present invention is an apparatus which continuously forms a glass ribbon in a molten state supplied on a fixed bed comprising continuous supports into a flat glass, the supports being formed by a base made of a material capable of containing a liquid therein or formed into a structure capable of containing a liquid therein; and the apparatus having a means of introducing to the supports a steam film forming agent which is not gaseous at a temperature in the vicinity of room temperature and which is gaseous at a temperature of at least the glass transition point of the glass, in a liquid state, and a means of making the supports and the glass ribbon at a temperature of at least the glass transition point slide on each other, via a thin layer of a steam film generated by vaporization of the steam film forming agent; characterized in that the fixed bed comprises a plurality of the supports arranged in such a state that they will not move in a direction in parallel with the glass ribbon moving direction, and having grooves to let loose the steam generated by vaporization of the steam film forming agent formed between the respective supports.

According to the present invention, the fixed bed comprises a plurality of supports arranged in such a state that they will not move in a direction in parallel with the glass ribbon moving direction, whereby the landing position of the glass ribbon can be securely determined so that the glass ribbon in a molten state supplied on the supports will not flow down into the grooves. Accordingly, stripes will not form on the formed flat glass.

In the preferred embodiment of the production apparatus of the present invention, a positioning roller to determine the landing position of the glass ribbon on the fixed bed is provided, whereby the glass ribbon curves around the side surface of the positioning roller and lands on the supports, and accordingly the landing impact can be decreased. Further, the positioning roller is formed by a base made of a material capable of containing a liquid therein or formed into a structure capable of containing a liquid therein, and at the same time, a steam film forming agent which is not gaseous at a temperature in the vicinity of room temperature and which is gaseous at least at the glass transition point of the glass or higher, is introduced in a liquid state to the positioning roller, and the positioning roller is in contact with the glass ribbon via a thin layer of a steam film generated by vaporization of the steam film forming agent, whereby the glass ribbon will not be scared.

Further, in the preferred embodiment of the production apparatus of the present invention, the fixed bed is constructed to be capable of adjusting the amount of the steam let loose from the respective grooves in accordance with the glass temperature distribution in the moving direction of the glass ribbon which moves on the fixed bed. Accordingly, the surface smoothness of the formed flat glass in the moving direction can be improved.

BRIEF EXPLANATION OF THE DRAWINGS

FIG. 1 is a side view schematically illustrating a flat glass production apparatus to carry out the present invention.

FIG. 2(a) is a side view and FIG. 2(b) is a plan view.

FIG. 3(a) is a side view and FIG. 3(b) is a plan view.

MODE FOR CARRYING OUT THE INVENTION

Now, the preferred embodiments of the present invention will be explained in detail with reference to the attached drawings.

Figure 5:
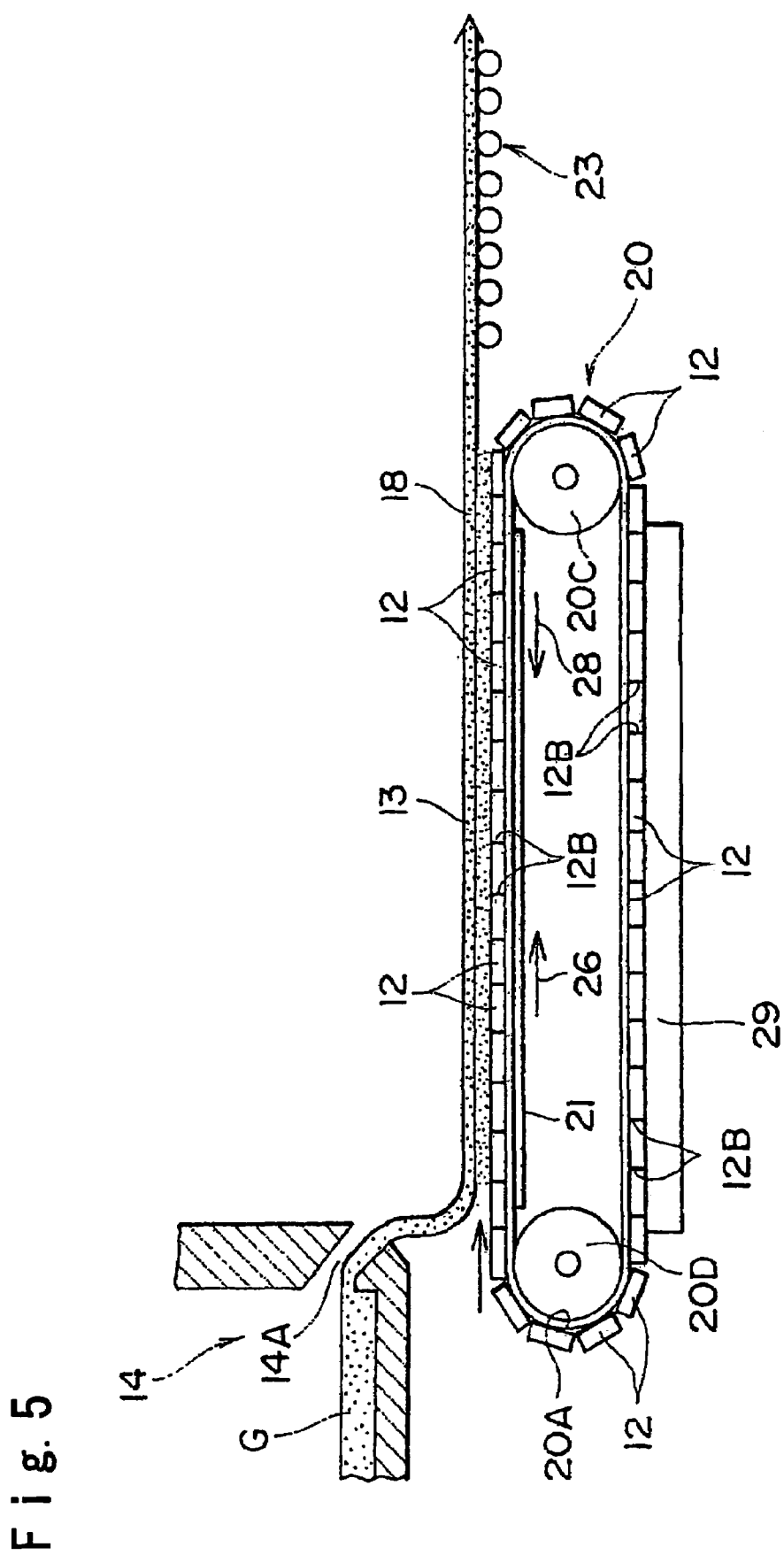
FIG. 5 is a side view schematically illustrating a conventional flat glass production apparatus in which supports make a circuit.

FIG. 1 is a side view schematically illustrating the apparatus for producing a flat glass of the present invention, and the same numerical references are appended to the same components as in FIG. 5.

A flat glass production apparatus 10 is composed mainly of a plurality of supports 12, 12 . . . formed to be capable of containing a steam film forming agent therein, a supply apparatus 16 (see FIG. 4) which supplies the steam film forming agent to the supports 12, and carriage driving rollers 23 which carry the formed glass ribbon 13. Further, at the preliminary step to the flat glass production apparatus 10, a glass melting furnace 14 which melts glass materials is provided, and from this glass melting furnace 14, a glass G in a molten state is supplied to the supports 12. The molten glass G is supplied to the flat glass production apparatus 10, where it is carried via a thin layer 18 of a steam film generated by vaporization of the steam film forming agent from the supports 12, whereby the glass ribbon 13 and the supports 12 are made to slide on each other via the thin layer 18 of the steam film, and a thin flat glass is formed on the supports 12.

The glass melting furnace 14 melts predetermined materials to be a flat glass and at the same time, controls the melting temperature to adjust the molten glass G to be in a viscosity range and in a temperature range suitable for forming. To carry out such glass forming, it is important that the temperature of the molten glass G in the initial stages of forming is within a predetermined range, at which the viscosity of the molten glass G is suitable for forming. Namely, preferred is a treatment in a temperature range in which the viscosity of the molten glass G is within a range of from 100 to 1,000,000 poise, preferably from 500 to 100,000 poise, more preferably from 1,000 to 50,000 poise.

The molten glass G the temperature and the viscosity of which are adjusted by the glass melting furnace 14 runs down as a flow of a glass ribbon 13 in a ribbon shape from a lip face 14B made of bricks of an exit slit 14A, and supplied on the supports 12 of the flat glass production apparatus 10.

In order to stably form a flat glass excellent in the smoothness, which has favorable smoothness on the moving direction of the formed flat glass and which is free from stripes, by such a flat glass production apparatus 10, it is necessary to uniformalize the thickness and the steam film pressure of the thin layer 18 of the steam film between the upstream side and the downstream side of the glass ribbon 13. Accordingly, the flat glass production apparatus 10 of the present invention employs a fixed bed 15 comprising a plurality of the supports 12 arranged in such a state that they will not move in a direction in parallel with the moving direction of the glass ribbon 13, and having grooves 12B, 12B . . . to let loose the steam generated by vaporization of the steam film forming agent formed between the respective supports 12, whereby the amount of the steam let loose from the respective grooves 12B is adjusted in accordance with the glass temperature distribution in the moving direction of the glass ribbon 13 which moves on the fixed bed 15, to form the glass ribbon 13 into a flat glass.

By employing such a fixed bed 15 comprising the supports 12 which will not move in a direction in parallel with the moving direction of the glass ribbon 13, the fixed bed 15 can be constructed in such a manner that the widths of the respective grooves 12B, 12B . . . can be freely set, or the lengths of the respective supports 12, 12 . . . in the glass ribbon moving direction can be freely set.

FIGS. 2(a) and 2(b) and FIGS. 3(a) and 3(b) illustrate examples of the preferred structure of the fixed bed 15. The grooves 12B include gaps in addition to the grooves in the literal sense of the word, and the fixed bed 15 comprising the supports 12 which will not move at least in a direction in parallel with the moving direction of the glass ribbon 13, means that the supports 12 are fixed only in the moving direction of the glass ribbon 13, and they may move in another direction. For example, the fixed bed 15 may be constructed in such a manner that the supports 12 reciprocate in a direction at right angles to the moving direction of the glass ribbon 13.

Figure 2A:
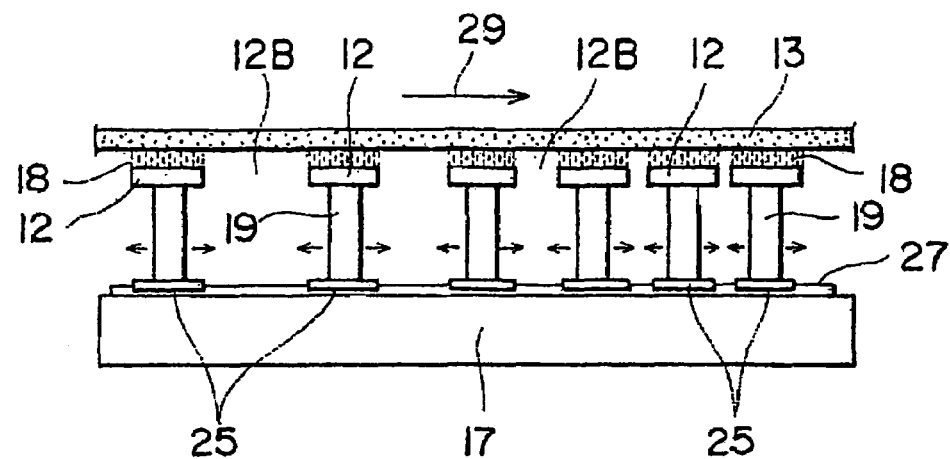
FIGS. 2(a) and 2(b) are conceptual views to explain a fixed bed.
Figure 2B:
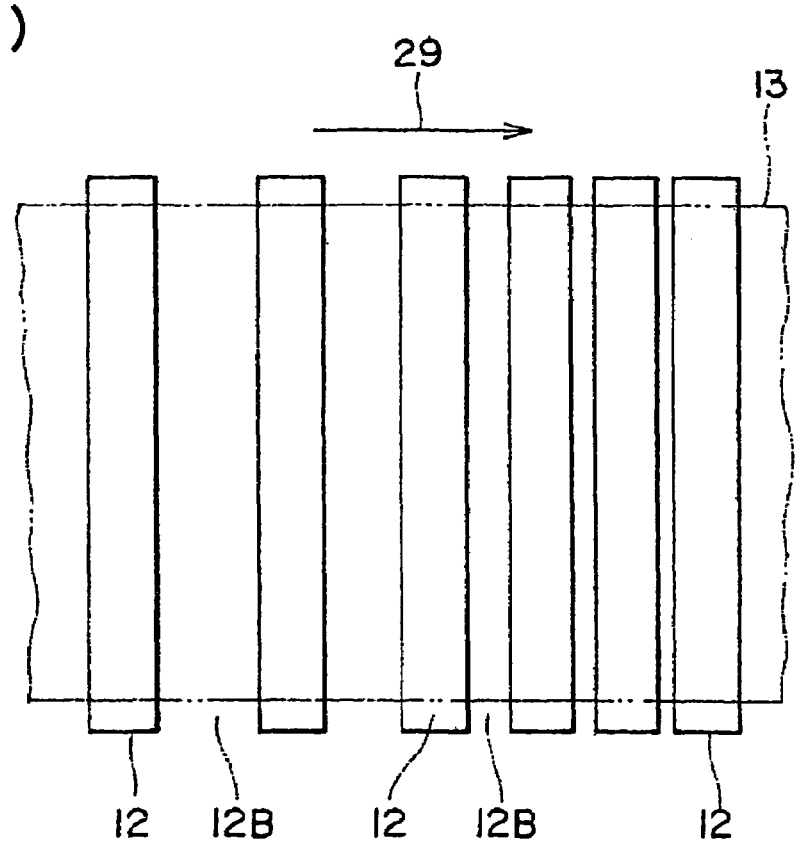

FIGS. 2(a) and 2(b) illustrate the fixed bed 15 constructed in such a manner that the lengths of the respective supports 12 in the glass ribbon moving direction 29 are the same, and the widths of the grooves 12B are narrower at the downstream side than at the upstream side in relation to the moving direction of the glass ribbon 13. Namely, a plurality of the supports 12 supported by supporting columns 19 are formed slidably on a rail 27 laid on a support base 17 in parallel with the moving direction of the glass ribbon 13 via linear bearings 25. Further, the respective supports 12 are fixed at optional positions on the rail 27 by stoppers not shown. Further, the respective supports 12 are arranged so that the widths of the grooves 12B are broad so that the steam is likely to be let loose at the upstream side at which the glass temperature of the glass ribbon 13 is high and the amount of the steam generated from the supports 12 is large, and the widths of the grooves 12B are narrow and the steam is hardly let loose at the downstream side at which the glass temperature of the glass ribbon 13 is low and the amount of the steam generated from the supports 12 is small. Accordingly, the thickness and the steam film pressure of the thin layer 18 of the steam film formed between the glass ribbon 13 and the supports 12 are uniformalized between the upstream side and the downstream side of the glass ribbon 13, whereby the surface smoothness of the formed flat glass in the moving direction will improve.

Figure 3A:
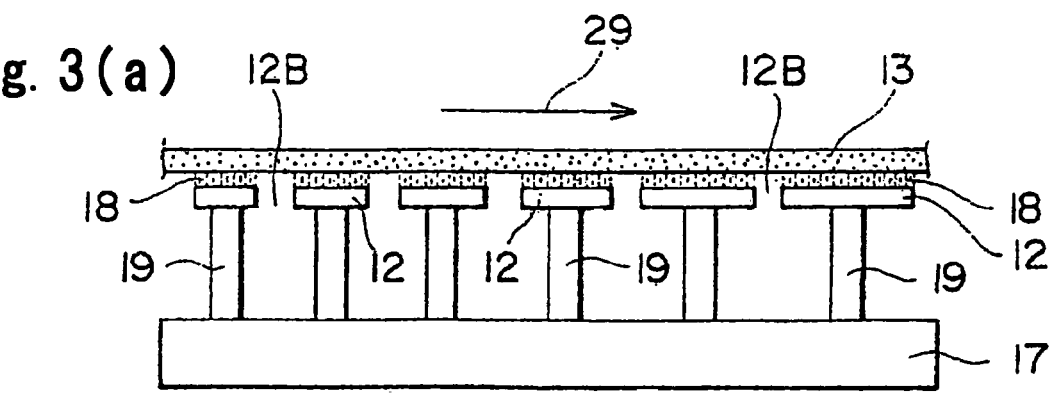
FIGS. 3(a) and 3(b) are conceptual views to explain another fixed bed.
Figure 3B:
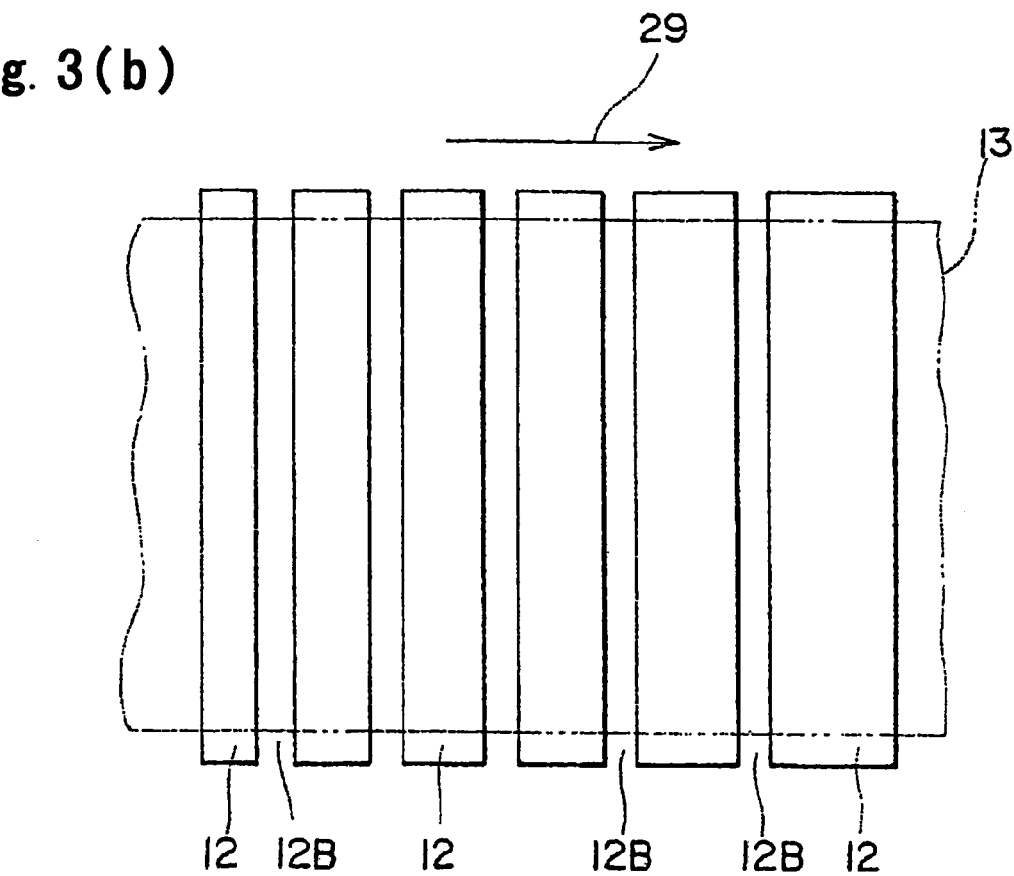

FIGS. 3(a) and 3(b) illustrate the fixed bed 15 constituted in such a manner that the widths of the respective grooves 12B are the same, and the lengths of the supports 12 in the glass ribbon moving direction 29 are longer at the downstream side than at the upstream side in relation to the moving direction of the glass ribbon 13. In this case, the distance between the grooves 12B is constant, and thus the supports 12 may be directly fixed on a support base 17 via supporting columns 19 as shown in FIG. 3(a), or they may be slidable by means of the rail 27 and the linear bearings 25 as shown in FIG. 2(a). Accordingly, the number of the grooves 12B formed per unit length in the glass ribbon length direction of the fixed bed 15 is high at the upstream side at which the glass temperature of the glass ribbon 13 is high and the amount of the steam generated from the supports 12 is large, and the number is low at the downstream side at which the glass temperature of the glass ribbon 13 is low and the amount of the steam generated from the supports 12 is small. Accordingly, the thickness and the steam film pressure of the thin layer 18 of the steam film formed between the glass ribbon 13 and the supports 12 are uniformalized between the upstream side and the downstream side of the glass ribbon 13, whereby the surface smoothness of the formed flat glass in the moving direction will improve.

The supports 12 are formed by a base made of a material capable of containing a liquid therein or formed into a structure capable of containing a liquid therein. Further, the supports 12 are preferably formed by a base made of a material having high affinity with the steam film forming agent or formed into a structure with which the steam film forming agent is easily contained. For example, a porous body or a fibrous body is preferably used. In a case of a porous body, preferred is one having continuous pores. It is important that the supports 12 have such a structure that the amount of generation of the steam of the steam film forming agent is uniform, and basically, the surface of the supports 12 is preferably a flat surface without any shape nor structure. In a case where a steam discharge portion is formed on the supports 12, fine pores which penetrate from the front surface to the back surface of the supports 12 are formed with a constant distance so that the pores are disposed on the surface of the supports 12 at an even density. The diameter of the pores is preferably at most 6 mm, more preferably at most 3 mm. Further, the distance between the pores is preferably at most 50 mm, more preferably at most 20 mm.

As the suitable base 12A (see FIG. 4) of the supports 12, porous hydrophilic carbon having continuous pores may be suitably used, and another material such as a polymer material derived from a natural product such as cellulose, paper, wood or bamboo, or a carbon type material, may, for example, be used. Further, a metal material such as iron, stainless steel, nickel, aluminum, platinum or titanium, a metal oxide such as aluminum oxide, zirconium oxide, silicon carbide or silicon nitrite, or a ceramic material containing a metal carbide or a metal nitride as the main component may, for example, be used.

To each of the supports 12, the steam film forming agent is supplied from a supply apparatus 16, and the steam film forming agent is instantaneously vaporized by the high heat of the glass ribbon 13, to form a thin layer 18 of a steam film between a plurality of the arranged supports 12, 12 . . . and the glass ribbon 13.

As the steam film forming agent, various organic or inorganic materials which are liquid at room temperature and which are gaseous at the glass transition point or higher may be used. Further, in view of operation properties in supply to the supports 12, preferred is one having a melting point of at most 40° C. and having a boiling point under atmospheric pressure of from 50 to 500° C., more preferably at most 300° C. Further, it is preferred that the steam generated by vaporization of the steam film forming agent is not so chemically reactive as to have bad influences over the glass and the supports 12, has low toxicity and is nonflammable at a temperature at which it is used, and water can be used as a representative example. As mentioned above, it is necessary to properly select as the steam film forming agent a liquid which is instantaneously vaporized by the high heat of the glass ribbon 13 and which can form a stable steam film. The thermal conductivity of the thin layer 18 of the steam film formed by instantaneous vaporization by the high heat is remarkably low as compared with the thermal conductivities of a liquid and a solid, and accordingly a heat insulating environment can be effectively formed for the glass ribbon 13.

Figure 4:
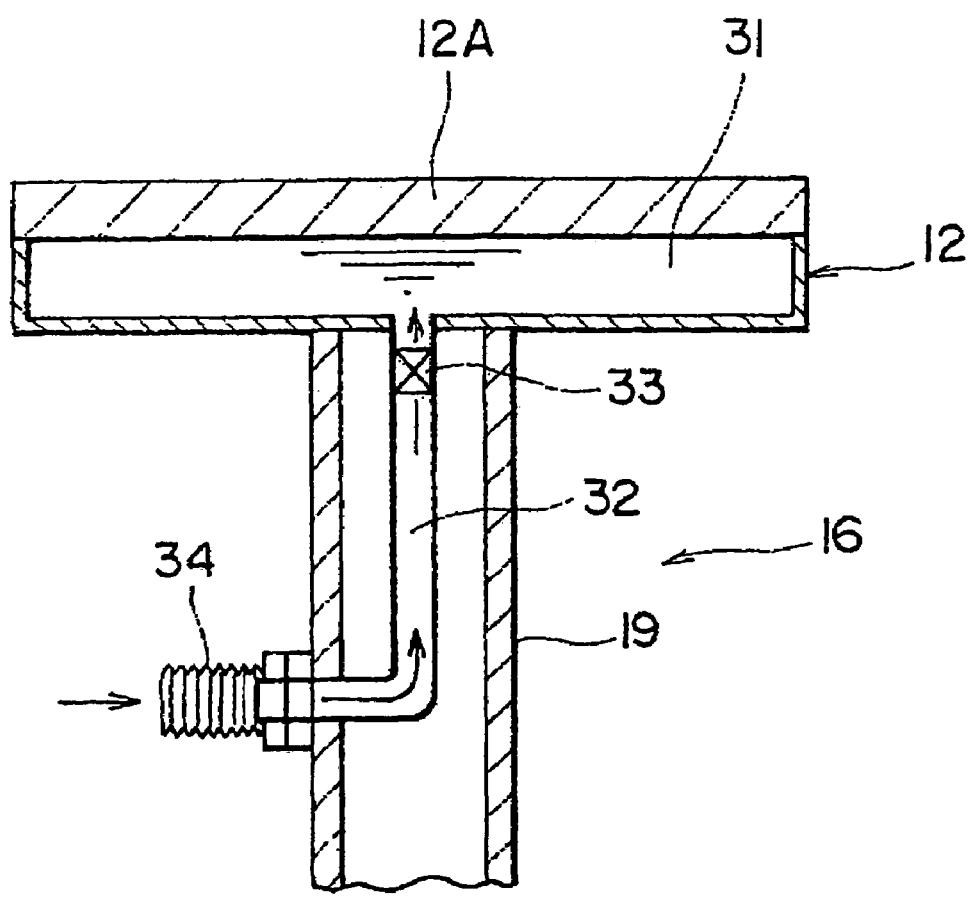
FIG. 4 is a drawing to explain a supply apparatus to a support.

The supply apparatus 16 which supplies the steam film forming agent to each support 12 is composed, as shown in FIG. 4, in such a manner that a hollow basin 31 is formed in the support 12, and the basin 31 and a supply piping 32 which passes through a supporting column 19 and extends to the outside are connected with each other, and the supply piping 32 is connected with a flexible hose 34. A check valve 33 is provided in the supply piping 32. The steam film forming agent is supplied to the basin 31 via the flexible hose 34 and the supply piping 32, and the steam film forming agent in the basin 31 permeates through a hydrophilic base 12A of the support 12. The supply apparatus 16 is not limited thereto, and another apparatus may be employed so long as it can stably supply the steam film forming agent to the support 12.

Further, as shown in FIG. 1, the supports 12 are arranged so that the landing position of the glass ribbon 13 in a molten state supplied on the supports 12 will not agree with the position of the grooves 12B between the supports 12. Further, at the above landing position, a positioning roller 24 which is formed by a base made of a material capable of containing a liquid therein or formed into a structure capable of containing a liquid therein is disposed. To the positioning roller 24, a steam film forming agent which is not gaseous at a temperature in the vicinity of room temperature (e.g. from 20 to 30° C.) and which is gaseous at the glass transition point of the glass ribbon 13 or higher is introduced in a liquid state. The material of the positioning roller 24 and the steam film forming agent are similar to ones as explained for the supports 12. By this positioning roller 24, positioning can be securely carried out so that the glass ribbon 13 in a molten state supplied on the supports 12 will not flow down into the groove 12B.

The tension to pull the glass ribbon 13 on the supports 12 in the carriage direction is generated by the resistance between a plurality of carriage driving rollers 23 and the glass ribbon 13. By making the number of revolutions of the carriage driving rollers 23 variable, the thickness and the quality of the flat glass to be formed are controlled, and at the same time, e.g. the period during which the glass ribbon 13 is in contact with the thin layer 18 of the steam film is changed to control e.g. the cooling time.

Now, a process for forming a flat glass by employing the above constructed flat glass production apparatus 10 will be explained below. Explanation will be made with reference to an example wherein water is used as the steam film forming agent.

As shown in FIG. 1, from a glass melting furnace 14, a molten glass G as a glass ribbon 13 in a ribbon shape is supplied from a lip face 14B to supports 12 of a flat glass production apparatus 10. On landing of the glass ribbon 13 on the supports 12, the supports 12 are arranged so that the landing position and the grooves 12B will not agree with each other and in addition, a positioning roller 24 is provided, whereby the glass ribbon 13 can securely be landed on the support 12. Accordingly, the glass ribbon 13 will not land on the groove 12B, whereby formation of the traces of grooves due to the glass ribbon 13 flowing down into the groove 12B can be prevented. Further, since the positioning roller 24 is provided, the glass ribbon 13 curves around the side surface of the positioning roller 24 and lands on the support, whereby the landing impact on the support 12 will be small. Accordingly, formation of the traces of landing on the glass ribbon 13 or formation of stripes on the flat glass can be prevented. In this case, the positioning roller 24 is in contact with the glass ribbon 13 via a thin layer 18 of a steam film, whereby the glass ribbon 13 will not be scared by the positioning roller 24.

When the high temperature glass ribbon 13 is continuously supplied on the supports 12, water maintained in the supports 12 is instantaneously vaporized by the high heat of the glass ribbon 13. Accordingly, water vapor is continuously generated at the interface between the glass ribbon 13 and the supports 12, whereby a thin layer 18 of a steam film is formed between the glass ribbon 13 and the supports 12. In such a case, the molten glass G supplied from the glass melting furnace 14, in a case of a conventional soda lime glass, is supplied on the supports 12 usually at a temperature of from 900 to 1,200° C. which is suitable for forming. However, if the temperature is too high, generation of the steam from the supports 12 tends to be too intense, whereby stable supply operation will be inhibited and at the same time, durability of various components as represented by the supports 12 and the apparatus will be impaired. Accordingly, depending on the glass composition, it is preferred that the glass ribbon 13 is made to run down on the supports 12 usually at a temperature not higher than 1,400° C.

As mentioned above, the temperature of the glass ribbon 13 which runs down from the glass melting furnace 14 to the supports 12 is preferably lower, however, if the temperature of the glass ribbon 13 which runs down is low, the upstream portion, particularly the falling portion, of the glass ribbon 13 is likely to float up from the supports 12, due to pull strength of the carriage driving rollers 23 which carry the glass ribbon 13. In such a case also, when the positioning roller 24 is disposed, floating of the glass ribbon 13 from the supports 12 can be prevented. Accordingly, the shape of the glass ribbon 13 will hardly be unstable, and the glass ribbon 13 will not windingly be carried. As mentioned above, the positioning roller 24 has two functions of preventing the glass ribbon 13 from flowing down into the grooves 12B and preventing the glass ribbon 13 from floating up.

INDUSTRIAL APPLICABILITY

According to the present invention, a fixed bed comprising a plurality of supports arranged in such a state that they will not move in a direction in parallel with the glass ribbon moving direction, and having grooves to let loose the steam generated by vaporization of a steam film forming agent formed between the respective supports, is employed, and the amount of the steam let loose from the grooves is adjusted, whereby the surface smoothness of a flat glass in the moving direction can be improved. Further, by arranging the supports so that the landing position of the glass ribbon in a molten state supplied on the supports will not on the grooves, formation of stripes on the flat glass can be prevented.

The entire disclosure of Japanese Patent Application No. 2002-182607 filed on Jun. 24, 2002 including specification, claims, drawings and summary is incorporated herein by reference in its entirety.

What is claimed is:

1. A process for producing a flat glass, said process comprising:
   forming a fixed bed including a plurality of supports formed by a base made of a material capable of containing a liquid therein or formed into a structure capable of containing a liquid therein;
   continuously supplying a glass ribbon in a molten state, to the fixed bed;
   introducing to the supports a steam film forming agent which is not gaseous at a temperature in the vicinity of room temperature and which is gaseous at a temperature of at least the glass transition point of the glass, in a liquid state;
   making the supports and the glass ribbon at a temperature of at least the glass transition point slide on each other, via a thin layer of a steam film generated by vaporization of the steam film forming agent, to form the glass ribbon into a flat glass,
   wherein the forming of the fixed bed includes:
      arranging the supports so that they will not move in a direction in parallel with the glass ribbon moving direction during sliding of the glass ribbon on the supports,
      forming grooves between respective supports to let loose the steam generated by vaporization of the steam film forming agent, and
      configuring the grooves and supports so that the amount of the steam let loose along the fixed bed is adjusted to vary in accordance with the glass temperature distribution in the moving direction of the glass ribbon on the fixed bed.

2. The process for producing a flat glass according to claim 1, wherein the amount of the steam let loose from the respective grooves is adjusted by making the lengths of the respective supports in the glass ribbon moving direction the same and by making the widths of the respective grooves narrower at the downstream side than at the upstream side in relation to the glass ribbon moving direction.

3. The process for producing a flat glass according to claim 1, wherein the amount of the steam let loose from the respective grooves is adjusted by making the widths of the respective grooves the same and by making the lengths of the supports in the glass ribbon moving direction longer at the downstream side than at the upstream side in relation to the glass ribbon moving direction.

4. The process for producing a flat glass according to claim 1, wherein the supports are arranged so that the landing position of the glass ribbon in a molten state supplied on the supports, on the fixed bed, will not agree with the position of the grooves.

5. A process for producing flat glass, said process comprising:
supplying a glass ribbon in a molten state onto a bed including a plurality of supports;
generating a layer of steam film between the glass ribbon and the bed by supplying to the plurality of supports a steam film forming agent in a liquid state that is vaporized by the molten glass ribbon on the bed;
sliding the glass ribbon in a feed direction along the layer of steam film on the plurality of supports; and
dispersing steam from the layer of steam film by different amounts along a length of the bed in the feed direction, to form the glass ribbon into a flat glass
wherein the different amounts of steam dispersed along the length of the bed in the feed direction are determined in accordance with a glass temperature distribution of the molten glass at different locations along the bed in the feed direction.

6. The process for producing a flat glass according to claim 5, wherein a large amount of steam is dispersed at an upstream location along the feed direction corresponding to a high glass temperature of the molten ribbon, and a small amount of steam is dispersed at a downstream location along the feed direction corresponding to a low glass temperature of the molten ribbon.

7. The process for producing a flat glass according to claim 5, wherein the steam is dispersed from the layer of steam film by providing the bed with grooves formed between adjacent supports of the plurality of supports.

8. The process for producing a flat glass according to claim 7, wherein the plurality of the supports do not move in a direction parallel to the feed direction during the sliding of the glass ribbon thereon.

9. The process for producing a flat glass according to claim 5, wherein the steam is dispersed from the layer of steam film by providing the bed with grooves formed between adjacent supports of the plurality of supports.

10. The process for producing a flat glass according to claim 9, wherein each of the grooves is formed with a same dimension in the feed direction, and wherein the plurality of supports are formed within increasing dimensions in the feed direction from an upstream side of the bed to a downstream side of the bed.

11. The process for producing a flat glass according to claim 9, wherein each of the supports of the plurality of supports is formed with a same dimension in the feed direction, and wherein the grooves are formed within decreasing dimensions in the feed direction from an upstream side of the bed to a downstream side of the bed.

12. The process for producing a flat glass according to claim 9, wherein the plurality of the supports do not move in a direction parallel to the feed direction during the sliding of the glass ribbon thereon.

13. The process for producing a flat glass according to claim 5, wherein the plurality of the supports do not move in a direction parallel to the feed direction during the sliding of the glass ribbon thereon.

14. The process for producing a flat glass according to claim 13, wherein the plurality of supports reciprocate in a direction perpendicular to the feed direction during the sliding of the glass ribbon thereon.

15. A process for producing a flat glass, said process comprising:
forming a fixed bed including a plurality of supports;
introducing to the plurality of supports a steam film forming agent;
supplying a glass ribbon in a molten state onto the plurality of supports such that a layer of a steam film is generated by vaporization of the steam film forming agent;
sliding the glass ribbon along the plurality of supports via the layer of steam film in a feed direction; and
dispersing steam from the layer of steam film by different amounts along a length of the bed in the feed direction, to form the glass ribbon into a flat glass
wherein the different amounts of steam dispersed along the length of the bed in the feed direction are determined in accordance with a glass temperature distribution of the molten class at different locations along the bed in the feed direction.

16. The process for producing a flat glass according to claim 15, wherein the steam is dispersed from the layer of steam film by providing the bed with grooves formed between adjacent supports of the plurality of supports.

17. The process for producing a flat glass according to claim 15, wherein the plurality of the supports do not move in a direction parallel to the feed direction during the sliding of the glass ribbon thereon.

* * * * *